US012460710B2

(12) United States Patent
Sampath et al.

(10) Patent No.: US 12,460,710 B2
(45) Date of Patent: Nov. 4, 2025

(54) FLEXIBLE SPLINE AND WAVE GENERATOR FOR STRAIN WAVE GEARING

(71) Applicants: I-HUB FOR ROBOTICS AND AUTONOMOUS SYSTEMS INNOVATION FOUNDATION, Bangalore (IN); MINISTRY OF HEAVY INDUSTRIES (MHI), GOVERNMENT OF INDIA, New Delhi (IN)

(72) Inventors: Kaushik Sampath, Bangalore (IN); Alok Singh Rawat, Bangalore (IN); Jyotishka Duttagupta, Bangalore (IN); Abhishek Sankar, Bangalore (IN)

(73) Assignees: I-HUB FOR ROBOTICS AND AUTONOMOUS SYSTEMS INNOVATION FOUNDATION, Bangalore (IN); MINISTRY OF HEAVY INDUSTRIES (MHI), GOVERNMENT OF INDIA, New Delhi (IN)

( * ) Notice: Subject to any disclaimer, the term of this patent is extended or adjusted under 35 U.S.C. 154(b) by 0 days.

(21) Appl. No.: 18/903,235

(22) Filed: Oct. 1, 2024

(65) Prior Publication Data

US 2025/0116320 A1    Apr. 10, 2025

(30) Foreign Application Priority Data

Oct. 5, 2023    (IN) .............................. 202341066798

(51) Int. Cl.
*F16H 49/00* (2006.01)
*F16H 55/06* (2006.01)
(Continued)

(52) U.S. Cl.
CPC ......... *F16H 49/001* (2013.01); *F16H 57/023* (2013.01); *F16H 2049/003* (2013.01);
(Continued)

(58) Field of Classification Search
CPC .. F16H 49/001; F16H 2049/003; F16H 55/06; F16H 57/023; F16H 2057/02034; F16H 2057/02073
See application file for complete search history.

(56) References Cited

U.S. PATENT DOCUMENTS 9,874,272 B2 *  1/2018  Yajima ................... F16H 49/001
10,648,550 B2 *  5/2020  Xie ........................ F16H 49/001
(Continued)

FOREIGN PATENT DOCUMENTS

WO    WO-2020017310 A1 *  1/2020

OTHER PUBLICATIONS

WO-2020017310-A1—Machine Translation (Year: 2020).*

*Primary Examiner* — Jake Cook
(74) *Attorney, Agent, or Firm* — ZIEGLER IP LAW GROUP, LLC.

(57) ABSTRACT

A strain wave gearing device includes a circular spline having a plurality of internal teeth; a flex spline having a plurality of external teeth, the flex spline is disposed coaxially with respect to the circular spline to allow one or more of the plurality of external teeth to engage with one or more of the plurality of internal teeth, wherein the flex spline is defined using Bezier curve defining a plurality of structural parameters associated with the flex spline; and a wave generator having an elliptical cam and a flexible bearing mounted on the elliptical cam, the wave generator is disposed coaxially with respect to the flex spline to allow the flexible bearing to have two-point contact with the flex spline.

9 Claims, 4 Drawing Sheets

(51) Int. Cl.
*F16H 57/02* (2012.01)
*F16H 57/023* (2012.01)

(52) U.S. Cl.
CPC .... *F16H 55/06* (2013.01); *F16H 2057/02034* (2013.01); *F16H 2057/02073* (2013.01)

(56) References Cited

U.S. PATENT DOCUMENTS

| | | | |
|---|---|---|---|
| 12,259,032 B2* | 3/2025 | Imagawa | F16H 49/001 |
| 2017/0254402 A1* | 9/2017 | Gilges | F16H 49/001 |
| 2020/0318720 A1* | 10/2020 | Ikeguchi | F16H 1/32 |

* cited by examiner

FLEXIBLE SPLINE AND WAVE GENERATOR FOR STRAIN WAVE GEARING

TECHNICAL FIELD

The present disclosure relates generally to motion control systems and more specifically, to strain wave gearing devices.

BACKGROUND

Strain wave gearing systems rely on the generation of a periodic strain or radial deflection wave on a flexible gearing element. Reduction is obtained as a result of wedging action between contacting gear teeth instead of the traditional meshing seen in spur or helical gearsets which facilitates the development of virtually zero backlash gearboxes. The gearing system can be used to provide reduction ratios upwards of 300:1 without the use of multiple stages typically seen in planetary and cycloidal gearsets. As result, strain wave gears have gained prominence in applications requiring high precision motion control, compactness, output torque and high back drive torque.

The flexible gearing element, in literature referred to as "flexible spline", is a thin-walled ring gear with external teeth at its rim. The material of the flexible spline is required have high strength and resilience while having adequate elasticity so as to be able to flex while transmitting torque without fracture over multiple cycles. The gear is traditionally made of metal alloys using complex machining operations which require the development of elaborate fixtures and custom tooling. In addition to this over 90% of the stock billet is lost as scrap waste, making the fabrication process fairly expensive. The use of metallic gears also increases the weight of the gearbox, making it unsuitable for versatile lightweight applications. As such, the present state-of-the-art leaves much to be desired for applications where low backlash, high back-drive torque and precision are required.

Therefore, in light of the foregoing discussion, there exist a need to overcome the aforementioned drawback associated with conventional strain wave gearing devices.

SUMMARY

The present disclosure provides a strain wave gearing device. The present disclosure provides a solution to the existing problem and provides a compact, lightweight and easily fabricable strain wave gearing device. An objective of the present disclosure is to provide a solution that overcomes at least partially the problems encountered in the prior art and provides an improved strain wave gearing device that has low backlash, high reduction ratio, high precision and has lower weight and manufacturing costs.

One or more objectives of the present disclosure is achieved by the solutions provided in the enclosed independent claims. Advantageous implementations of the present disclosure are further defined in the dependent claims.

In one aspect, the present disclosure provides strain wave gearing device comprising:
- a circular spline having a plurality of internal teeth;
- a flex spline having a plurality of external teeth, the flex spline is disposed coaxially with respect to the circular spline to allow one or more of the plurality of external teeth to engage with one or more of the plurality of internal teeth, wherein the flex spline is defined using Bezier curve defining a plurality of structural parameters associated with the flex spline; and
- a wave generator having an elliptical cam and a flexible bearing mounted on the elliptical cam, the wave generator is disposed coaxially with respect to the flex spline to allow the flexible bearing to have two-point contact with the flex spline.

The disclosed strain wave gearing device of the present invention has a comprehensive design that achieves superior performance as compared to the conventional strain wave devices. The coaxial arrangement of the plurality of internal teeth of the circular spline and the plurality of external teeth of the flex spline enables precise engagement, resulting in efficient torque transmission. Beneficially, the utilization of the Bezier curve to define the flex spline provides a high level of customization, enabling meticulous shaping and adaptation of characteristics based on operational requirements. Further, the Bezier curve may be to make the flex spline suitable to be manufactured from lightweight plastics using economical methods like vacuum casting, injection moulding and additive manufacturing. The wave generator comprises the elliptical cam and the flexible bearing enhances functionality by being coaxially aligned with the flex spline and ensures optimal motion transmission. Moreover, the two-point contact of the flexible bearing with the flex spline provides stable and controlled engagement.

In a further implementation form, the plurality of structural parameters comprises
- a width for contact of the flexible bearing with flex spline;
- a length of the flex spline;
- a curvature of the flex spline;
- an inner radius of the flex spline;
- a thickness of the flex spline; and
- a radius of an output hub of the flex spline.

In this implementation, the structural parameters such as the width for contact of the flexible bearing with the flex spline, length of the flex spline, the curvature of the flex spline, thickness of the flex spline and radius of an output hub of the flex spline provide balance between structural resilience and efficient deformation and ensuring the durability and reliable performance. Optionally, the structural parameters also include the reduction ratio and module of the plurality of external teeth of the flex spline furnish the capability to finely calibrate the speed-to-torque ratio and optimize motion transformation, enhancing the utility of the strain wave gearing device.

In an embodiment, the plurality of external teeth is configured to be involute and is cut-into the flex spline.

Advantageously, the involute profile of the plurality of external teeth enables smooth transfer of motion and torque, ensuring a gradual and consistent contact between the plurality of external teeth and the plurality of internal teeth. The involute profile for the plurality of external teeth and cutting them into the flex spline achieves a higher degree of precision in motion transfer, and minimizes abrupt changes in contact points, reducing wear, noise, and potential stress concentrations that can occur with non-involute tooth profiles.

In a further implementation form, the output hub of the flex spline has a first thickness and remaining portions of the flex spline has a second uniform thickness smaller than the first thickness.

In this implementation, the larger first thickness of the output hub enhances mechanical robustness, enabling effective withstanding and transmitting torque to the output. Meanwhile, the uniform smaller thickness of the remaining portions reduces overall weight, preventing unnecessary mass accumulation while still maintaining the necessary mechanical properties. Moreover, the flex spline allows the wave generator to be arranged therein thus, a smaller thickness of the second uniform thickness allows for easy accommodation of the wave generator as a smaller thickness of the second uniform thickness can be easily deformed as compared to the larger first thickness. Furthermore, deforming the second uniform thickness changes the circular cross section of the flex spline to the elliptical cross section.

In some embodiments, the strain wave gearing device further comprises:
   a brushless motor operatively coupled to the elliptical cam of the wave generator; and
   a motor casing coupled to the brushless motor.

In this implementation, the brushless motor is arranged for providing the input to the wave generator to generate the wave-like motion. The brushless motor allows for reliable synchronization leading to consistent and optimized output. Moreover, the motor casing coupled to the brushless motor provides a protective enclosure, safeguarding the internal components of the brushless motor from environmental factors and potential damage. Beneficially, the motor casing ensures the longevity and reliable performance of the brushless motor, thus, providing sustained operation of the strain wave gearing device.

In some embodiments, the strain wave gearing device further comprises:
   a pair of output flanges operatively coupled to the flex spline;
   a ball bearing arranged between the pair of output flanges;
   a gearbox casing supporting the flex spline, the ball bearing and the pair of output flanges; and
   a cover coupled to the gearbox casing.

In this implementation, the pair of output flanges, a ball bearing, a gearbox casing supporting the flex spline, and a cover in the strain wave gearing device enhances the structural robustness, efficient torque transmission, and protection from external elements. The pair of output flanges are arranged to provide the output therefrom. Moreover, the cover is arranged to cover the assembly. The ball bearing is arranged between the pair of output flanges to provide a seamless output.

In an embodiment, the flexible bearing is mounted on the elliptical cam using a tapered cam slider. In this implementation, mounting the flexible bearing on the elliptical cam using the tapered cam slider ensures a secure and stable connection, fostering precise motion transfer and minimizing friction, thus contributing to efficiency and reliability.

In an embodiment, the tapered cam slider comprises an elongate member having a first circular end and a tapered second elliptical end integral with the first circular end, wherein a perimeter of the second elliptical end is equal to a perimeter of the elliptical cam; a plate member having a diameter larger than the perimeter of the second elliptical end; and a plurality of fasteners for coupling the elongate member and the plate member, wherein the elliptical cam is configured to be arranged between the elongate member and the plate member aligning the perimeter of the second elliptical end with the perimeter of the elliptical cam. In this implementation, the tapered cam slider enables in ensuring a secure and precise connection between the elliptical cam and the flexible bearing, promoting uniform pressure distribution and enhanced stability while mounting.

In an embodiment, the circular spline, flex spline and wave generator are composed of plastic. In an embodiment, employing plastic for the circular spline, flex spline, and wave generator helps in achieving streamlined motion transfer, controlled deformation, and consistent, dependable functionality. Moreover, using plastic for fabricating the circular spline, flex spline and the wave generator reduces friction, and maximizes the overall efficiency, accuracy, and reduces weight of the gears and the manufacturing costs.

In an embodiment, the circular spline, flex spline and wave generator are made using 3D printing and vacuum casting. In an embodiment, the utilization of 3D printing enables the production of intricate and customized geometries of the circular spline, flex spline and the wave generator for achieving precise teeth profiles in the circular spline and flex spline ensuring the controlled deformation of the flex spline. Similarly, vacuum casting ensures a high level of detail fidelity and surface finish, delivering components with a greater level of smoothness and accuracy. In this regard, 3D printing and vacuum casting allow for efficient testing and refinement of designs thereby enhancing accuracy, reducing production time, and minimizing material wastage.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those in the art will understand that the drawings are not to scale. Wherever possible, like elements have been indicated by identical numbers.

Embodiments of the present disclosure will now be described, by way of example only, with reference to the following diagrams wherein.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practicing the present disclosure are also possible.

Figure 1:
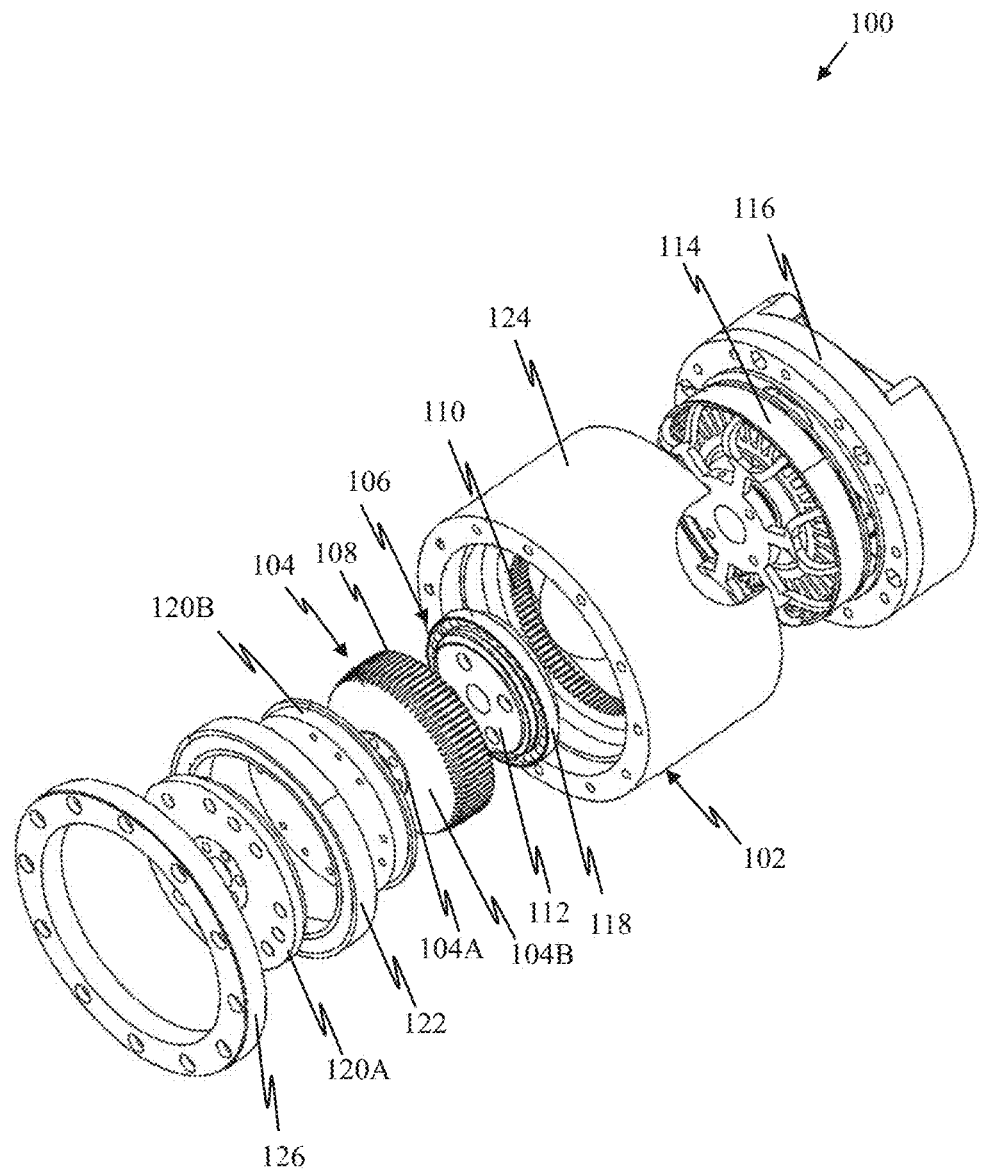
FIG. 1 is an exploded view of a strain wave gearing device, in accordance with an embodiment of the present disclosure.

FIG. 1 is an exploded view of a strain wave gearing device 100, in accordance with an embodiment of the present disclosure. The strain wave gearing device 100 comprises a circular spline 102, a flex spline 104, a wave generator 106.

The term "strain wave gearing device" is a mechanical device that is configured to provide precise motion control and high gear reduction. In particular, the strain wave gearing device 100 is capable to transmit rotational motion from an input shaft to an output shaft efficiently and accurately. The strain wave gearing device 100 accomplishes transmission of motion through a gearing mechanism that relies on the mating of tooths. Moreover, the resulting motion significantly reduces the speed, making it well-suited for applications requiring precise movements, such as robotics, aerospace systems, industrial automation and so forth. It will be appreciated that the strain wave gearing device 100 is configured to mitigate backlash. The term backlash refers to the unwanted play or movement between mating tooths. This reduction in backlash ensures the motion transfer occurs with minimal irregularities. Herein, the strain wave gearing device 100 offers a compact form factor, allowing them to be integrated into systems with limited space availability. Despite the size of the strain wave gearing device 100 exhibit robust torque transmission capabilities, enabling it to handle substantial loads while maintaining the desired level of precision.

The strain wave gearing device 100 comprises the flex spline 104. The term "flex spline" refers to a flexible thin-walled, cylindrical component configured to deform and engage with other components, such as the circular spline 102. Typically, the flex spline 104 comprises the plurality of external teeth 108 arranged on the outer surface of the flex spline 104.

It will be appreciated that the flexibility of the flex spline 104 in a strain wave gearing device 100 enables intricate motion transmission. The flexibility of the flex spline 104 is designed to accommodate the deformations generated by the motion of the wave generator 106. When the wave generator 106 imparts its wave-like motion to the flex spline 104, the inherent flexibility of the flex spline 104 allows it to deform in response. This deformation results in a wave-shaped surface that moves along the length of the flex spline 104. The flexibility ensures that the flex spline 104 can adjust its shape to match the wave pattern generated by the wave generator 106. As a result, the plurality of external teeth 108 of the flex spline 104 engages with the plurality of internal teeth 110 of the circular spline 102 while undergoing minimal stress or distortion. The term "wave generator" refers to a central part that generates a wave-shaped motion, typically resembling an elliptical shape.

Notably, the wave generator 106 comprises an elliptical cam 112 responsible for initiating the motion transfer within the strain wave gearing device 100. The wave generator 106 is configured to facilitate precise motion control and gear reduction. In particular, the wave generator 106 is responsible for initiating and propagating a distinct wave-like motion that drives the wave gearing device 100. The motion of the wave generator 106 is elliptical and serves as the driving force that enables the transmission of rotational motion from the input shaft to the output shaft.

In an embodiment, the strain wave gearing device 100 further comprises a brushless motor 114 operatively coupled to the elliptical cam 112 of the wave generator 106 and a motor casing 116 coupled to the brushless motor 114. The brushless motor 114 is mechanically connected to the wave generator 106 to induce the wave motion. As the brushless motor 114 rotates, in response rotating the wave generator 106 generates the wave pattern. This wave motion is then transferred to the flex spline 104 initiating engagements that further lead to gear reduction. Beneficially, the wave generator 106 is configured to create a controlled wave pattern, combined with the flex spline 104, ensuring the accurate and reliable transfer of motion from the input to the output. The wave generator 106 engages with the circular spline 102. The motor casing 116 provides stability and supports the brushless motor 114 internal components, preventing shifting or misalignment during operation. Moreover, the motor casing 116 ensures safety, and efficient performance by managing heat and reducing noise.

The term "circular spline" refers to an outer ring with inward-facing teeth that engages with the plurality of external teeth of the flex spline. As shown, the circular spline 102 forms an outer ring having the plurality of internal teeth 110 configured to mesh with the plurality of the external teeth 108 of the flex spline 104 to transmit motion and torque. Typically, the circular spline 102 remains stationary during operation and provides the interface for the meshing of teeth. As the plurality of external teeth 108 of the flex spline 104 engages with the plurality of internal teeth 110 of the circular spline 102, rotational motion is transferred.

The flex spline 104 deforms in response to the motion from the wave generator 106, and the plurality of external teeth 108 engages and disengages with the plurality of internal teeth 110 of the circular spline 102. The interaction results in the transfer of rotational motion from the flex spline 104 to the circular spline 102 and thus minimizes backlash and ensures accurate positioning and smooth operation. The wave generator 106 is disposed of coaxially with respect to the flex spline 104 to allow a flexible bearing 118 to have two-point contact with the flex spline 104. The rotational axes of the wave generator 106 and the flex spline 104 are positioned coaxially such that they are aligned sharing the same central axis. This alignment ensures a seamless interaction. The term "flexible bearing" refers to a pivotal element that connects the wave generator and the flex spline while accommodating their alignment. With the coaxial alignment, the flexible bearing 118, establishes two-point contact with the flex spline.

When the wave generator 106 is arranged within the flex spline 104, the flex spline conforms to the shape of the elliptical cam 112 that is arranged within the flexible bearing 118 forming the elliptical shape of the wave generator 106. When the elliptical deformed flex spline 104 is arranged within the circular spline 102 major axis of the elliptical deformed flex spline 104 aligns with a diameter of the circular spline 102 forming two-point contact emerges at diametrically opposite ends along the major axis of the elliptical deformed flex spline 104. These points of contact denote the locations where the elliptical deformed flex spline 104 and the circular spline 102 intersect each other tangentially. This two-point contact enhances stability by preventing wobbling thereby ensuring the controlled and predictable motion transfer. Moreover, the two-point contact fosters precise engagement, minimizing friction and backlash during the transmission of motion. When the input rotates, a propagating strain wave, whose amplitude is equal to the eccentricity of the elliptical cam 112, is generated in a cyclic nature. The flex spline 104 has two fewer teeth compared to the circular spline 102. Hence, for every full rotation of the wave generator 106, the flex spline 104 rotates by two teeth in the opposite direction.

Figure 2:
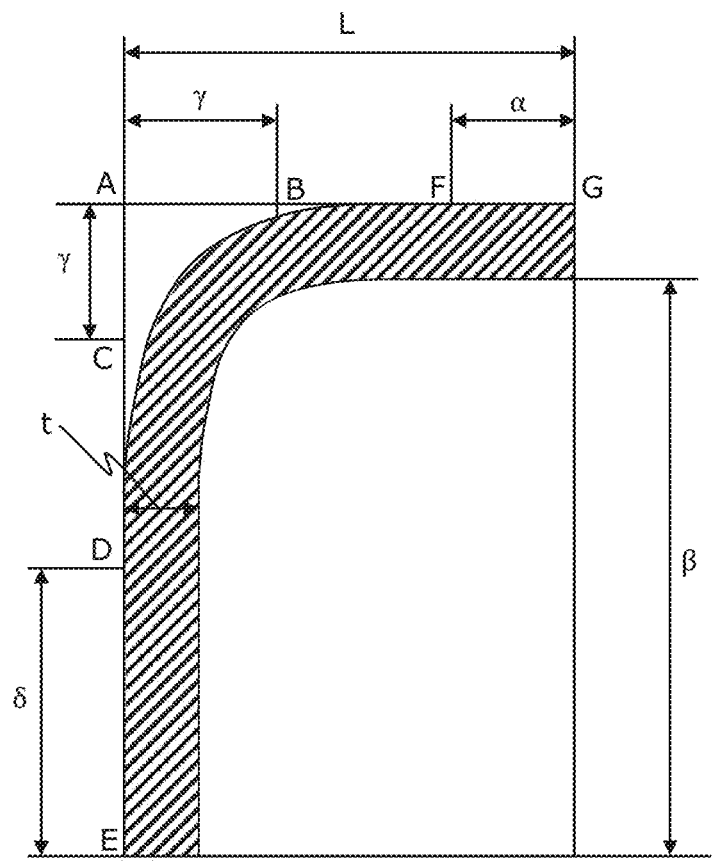
FIG. 2 is sectional view of a portion of flex spline, of the strain wave gearing device, depicting various structural parameters associated therewith, in accordance with an embodiment of the present disclosure.

The flex spline 104 is defined using the Bezier curve defining a plurality of structural parameters associated with the flex spline, which is explained in greater detail in conjunction with FIG. 2. The Bezier curve is constructed by defining control points to create smooth and intricate curves, and to define the tooth profiles on the flex spline 104. By utilizing the Bezier curve, tooth geometry of the plurality of external teeth 108 of the flex spline 104 is fabricated to ensure optimal engagement with the circular spline 102 for efficient torque transmission. In particular, the Bezier curve involves placing a set of control points to outline the desired shape of the tooth profile. The control points influence the curvature and characteristics of the resulting Bezier curve.

Through Bezier interpolation algorithms, the coordinates of points along the curve are calculated based on these control points to yield a smooth and accurate tooth profile. Afterwards, refinement of the tooth profile is done to ensure the tooth profile aligns precisely with the operational requirements of the strain wave gearing device 100, considering factors such as backlash reduction and load distribution. Once the individual tooth profile is established, the tooth profile is duplicated and arranged around the circumference of the flex spline 104 to form the plurality of external teeth 108. Beneficially, the Bezier curve provides smooth and precise tooth profiles for optimal engagement between the flex spline 104 and the circular spline 102, reducing backlash and enhancing overall efficiency, resulting in improved motion control, torque transmission, and performance of the strain wave gearing device.

Moreover, the plurality of external teeth 108 is configured to be involute and is cut-into the flex spline 104. Notably, the involute tooth profile is characterized by its smooth curve and provides efficient power transmission, reduced friction, and minimal wear. Typically, the plurality of external teeth 108 is designed to follow the contour of the involute curve to provide a constant contact ratio during the engagement, resulting in even load distribution and smoother motion transfer. The involute tooth profile enables gears to maintain accurate meshing while accommodating slight variations in centre-to-centre distance between the gears, contributing to a reduction in the effects of manufacturing tolerances. Furthermore, the involute tooth profile ensures that the plurality of external teeth 108 continues to mesh effectively even if slight misalignments occur during operation. Thus, enhancing the durability and longevity of the plurality of external teeth 108.

The plurality of external teeth 108 is cut-into the flex spline 104. The plurality of external teeth 108 is fabricated by removing material from a base material to form the flex spline 104. This method involves precision machining techniques to carve out the intricate contours of the plurality of external teeth 108. Suitably, the manufacturing process of the flex spline 104 begins with a solid piece of material that serves as the base material. The material is secured in a machining setup, and specialized cutting tools or machinery are employed to precisely remove excess material according to the predetermined tooth profile. The process involves the controlled removal of material in a way that conforms to the geometry of the plurality of external teeth 108.

In an embodiment, the plurality of structural parameters comprises a width for contact of the flexible bearing 118 with flex spline 104, a length of the flex spline 104, a curvature of the flex spline 104, an inner radius of the flex spline 104, a thickness of the flex spline 104, and a radius of an output hub 104A of the flex spline 104. The plurality of structural parameters also comprises a reduction ratio and module of the plurality of external teeth 108 of the flex spline 104. The term "structural parameter" refers to a set of characteristics that collectively define the configuration and performance of the strain wave gearing device. The "output hub" refers to the central portion of the flex spline that interfaces with the output shaft, transmitting the rotational motion. The reduction ratio signifies the extent of speed reduction achieved by the plurality of external teeth 108 of the flex spline 104. The width for contact of the flexible bearing 118 with flex spline 104 pertains to the extent of the contact area between the flexible bearing 118 and the flex spline 104. The width directly affects the stability and smoothness of motion transfer, influencing efficiency and accuracy. The length of the flex spline 104 defines the size thereof. The curvature of the flex spline defines its shape as it undergoes deformation during operation for ensuring accurate engagement with the circular spline 102. The thickness of the flex spline 104 determines structural integrity and ability to withstand torque loads. The diameter of the output hub 104A enables the transmission of motion.

In an embodiment, the output hub 104A of the flex spline 104 has a first thickness and remaining portions 104B of the flex spline 104 has a second uniform thickness smaller than the first thickness. In this regard, the flex spline 104 has the first thickness and the second thickness. The larger first thickness of the output hub 104A enhances mechanical robustness, ensuring in the handling of the torque and load transmitted to the output shaft effectively. The gradual transition from the thicker output hub 104A to the thinner sections disperses the load more evenly, minimizing stress concentration points and potential failure. The varying thicknesses of the flex spline 104 respond to deformation during operation, aiding in assembling the elliptical cam 112 within the flex spline 104 at the second thickness. The purpose of the second thickness smaller than the first thickness is that the first thickness is configured to be deformed when the wave generator 106 is arranged within the flex spline 104. Moreover, the purpose of the first thickness larger than the second thickness is that it provides the surface to receive output.

In an embodiment, the strain wave gearing device 100 further comprises a pair of output flanges 120A, 120B, respectively, operatively coupled to the flex spline 104, a ball bearing 122 arranged between the pair of output flanges 120A-B, a gearbox casing 124 supporting the flex spline 104, the ball bearing 122 and the pair of output flanges 120A-B and a cover 126 coupled to the gearbox casing 124. The pair of output flanges 120A-B are linked to the flex spline 104 to transmit the output motion and torque to external components. Typically, a bolt holes on the pair of output flanges 120A-B are used to connect the device to the external load. The pair of output flanges 120A-B connected to the flex spline 104 ensures a direct transfer of the controlled motion achieved through the device. The ball bearing 122 is positioned between the aforementioned pair of output flanges 120A-B. The ball bearing 122 supports and facilitates the smooth rotation of pair of output flanges 120A-B by reducing friction and enabling efficient rotational movement. Optionally, a roller bearing may be utilised between the pair of output flanges 120A, 120B.

The gearbox casing 124 provides a support structure and envelops the flex spline 104, the ball bearing 122, and the pair of output flanges 120A-B. The gearbox casing 124 acts as a protective enclosure, shielding the components from external elements and potential damage. Furthermore, the gearbox casing 124 bolsters the structural stability of the device, maintaining the precise alignment and engagement of internal elements critical to its operation. The cover 126 is affixed to the gearbox casing 124. The cover 126 provides a layer of protection to secure the components within the gearbox casing 124. The shape of the plurality of external teeth 108 of the flex spline 104 is defined by a Bezier curve which ensures smooth flexural wave propagation from the flex spline 104 to the pair of output flanges 120A-B mitigating undesirable stress concentration.

Referring now to FIG. 2, illustrated is a sectional view of a portion of flex spline 104, of the strain wave gearing device 100, depicting various structural parameters associated therewith, in accordance with an embodiment of the present disclosure. In an exemplary embodiment, the Bezier curve is constructed by defining seven control points, namely A, B, C, D, E, F and G. The coordinates of the control points are defined with point A being origin, and the coordinates of the other points (namely B, C, D, E, F and G) are defined in association with point A using various structural parameters of the flex spline, which are as follows:

$$A = (0, 0)$$
$$B = (\gamma, 0)$$
$$C = (0, -\gamma)$$
$$D = (0, -(\beta + t - \delta))$$
$$E = (0, -(t + \beta))$$
$$F = (L - \alpha, 0)$$
$$G = (L, 0)$$

where:
γ is the curvature of the flex spline 104,
β is the inner radius of the flex spline 104,
t is the thickness of the flex spline 104,
δ is the radius of the output hub 104A of the flex spline 104,
α is the width for contact of the flexible bearing 118 with flex spline 104, and
L is the length of the flex spline 118.

In an exemplary embodiment, the range of inner radius of the flex spline may in range of: 16 mm≤β≤80 mm. Further, the ranges of the other parameters may be defined w.r.t to β, and which are as follows:

$$\beta \le L \le 1.4\beta$$
$$0.4\beta \le \delta \le 0.68\beta$$
$$0.004\beta \le t \le 1.35\beta$$
$$0.2\beta \le \alpha \le 0.36\beta$$
$$0 \le \gamma \le \text{minimum}(\beta + t - \delta, L - \alpha).$$

In an example, the width (α) for contact of the flexible bearing 118 with flex spline is 6 millimetres (mm), the length (L) of the flex spline 104 is 24 mm, the curvature (γ) of the flex spline 104 is 9 mm, the thickness (t) of the flex spline 104 is 4 mm, and the radius (δ) of an output hub 104A of the flex spline is 14.10 mm, and the inner radius (β) of the flex spline 104 is 31 mm.

Figure 3A:
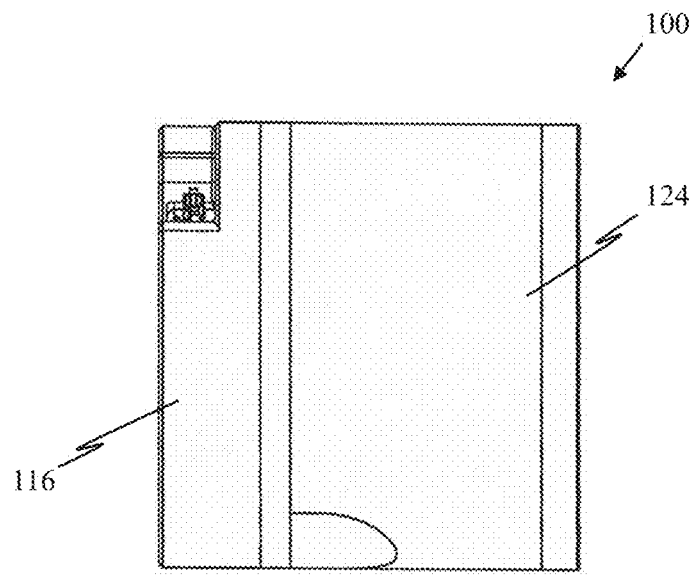
FIGS. 3A and 3B are a side view and a perspective view, respectively, of the strain wave gearing device in an assembled state, in accordance with an embodiment of the present disclosure.
Figure 3B:
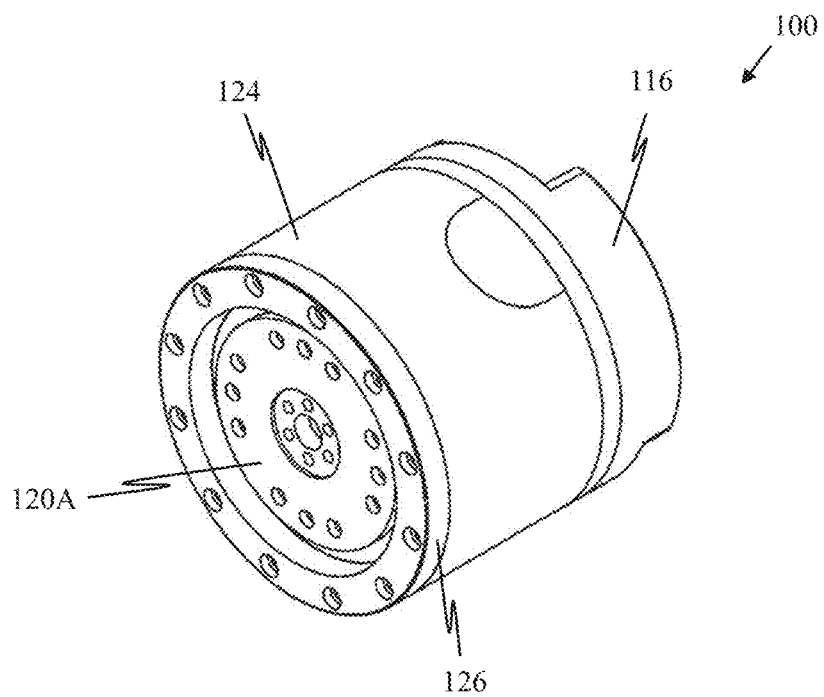

FIGS. 3A and 3B are a side and a perspective view, respectively, of the strain wave gearing device 100 in an assembled state, in accordance with an embodiment of the present disclosure. FIGS. 3A and 3B, majorly depicts the motor casing 116 and the gearbox casing 124.

According to an embodiment, the strain wave gearing device 100, typically the circular spline 102, the flex spline 104 and the wave generator 106 are composed of plastic. Beneficially, the plastic can be moulded into intricate shapes allowing for the plurality of external teeth 108 and the plurality of internal teeth 110 cut into the base material thereby allowing optimized engagement between the circular spline 102 and the flex spline 104. The plastic offers lightweight and minimizes inertia and friction. Moreover, fabricating the circular spline 102, flex spline 104 and the wave generator 106 using plastic contributes to reducing noise and smoother motion, thus, improving the overall efficiency of the strain wave gearing device 100.

The circular spline 102, flex spline 104 and the wave generator 106 are made using 3D printing and vacuum casting. The 3D printing involves fabricating the circular spline 102, flex spline 104 and the wave generator 106 by depositing the material in layer-by-layer pattern by using 3D printer. The 3D printing allows the fabrication of complex designs such as the plurality of external teeth 108 and the plurality of internal teeth 110. The vacuum casting is a process that involves creating replicas of the circular spline 102, flex spline 104 and the wave generator 106 using a master mold and liquid materials, such as plastics. The process begins by producing a master model, usually through techniques like 3D printing or CNC machining. A silicone mold is then formed around the master model. Liquid plastic is poured into this mold, and vacuum pressure is applied to remove air bubbles and ensure precise replication of details. The result is a high-quality duplicate of the original model with fine surface finishes and accurate dimensions. Collectively, the integration of 3D printing and vacuum casting for manufacturing the circular spline 102, flex spline 104 and the wave generator 106 enables intricate designs, customization, and accuracy for seamless operation and reliability.

Figure 4A:
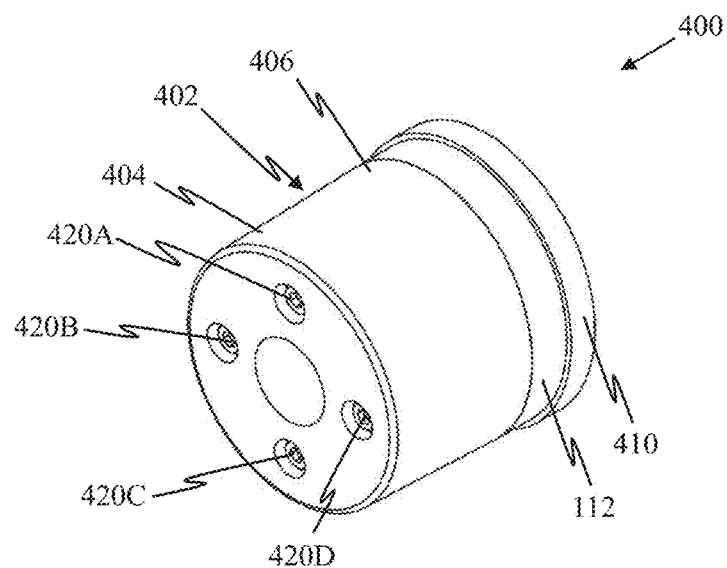
FIGS. 4A and 4B are perspective assembled and unassembled views, respectively, of a tapered cam slider, in accordance with an embodiment of the present disclosure.
Figure 4B:
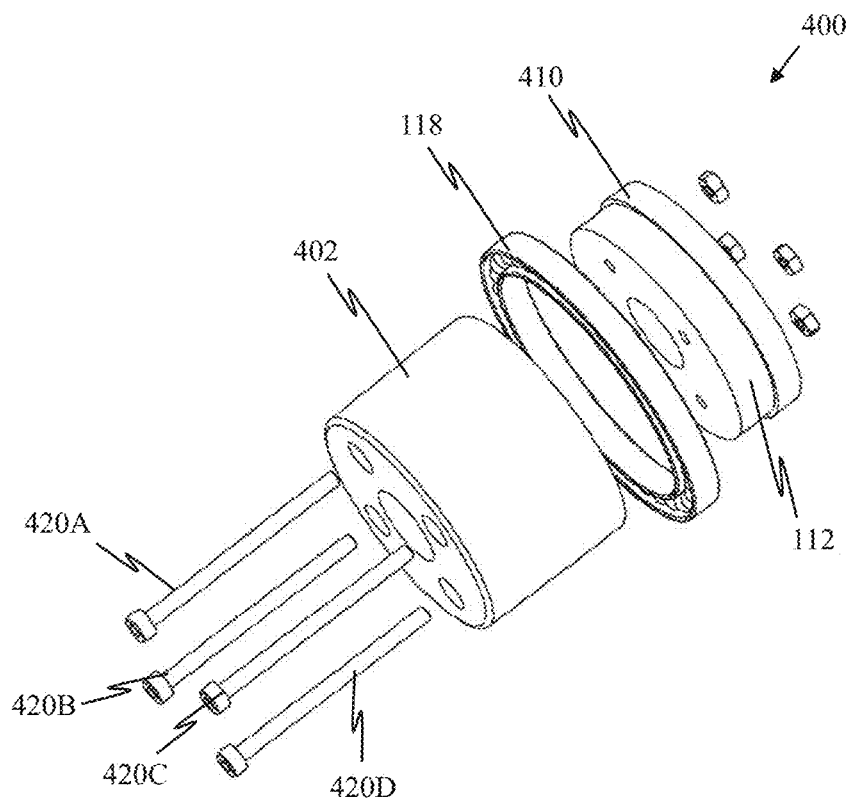

FIGS. 4A and 4B are perspective assembled view and an unassembled view of a tapered cam slider 400, respectively, in accordance with an embodiment of the present disclosure. As shown, the tapered cam slider 400 includes an elongate member 402 having a first circular end 404 and a tapered second elliptical end 406 integral with the first circular end 404. The elongate member 402 is configured have the second elliptical end 406 with a perimeter equal to a perimeter of the elliptical cam 412. The tapered cam slider 400 also includes a plate member 410 having a diameter larger than the perimeter of the second elliptical end 406. In an example, the diameter of the plate member 410 may be larger as compared to the perimeter of the second elliptical end 406 by a few millimetres or a centimetre. The tapered cam slider 400 also includes a plurality of fasteners 420A, 420B, 420C and 420D. In an example, each of the plurality of fasteners 420A, 420B, 420C and 420D is a nut and bolt arrangement. As shown in FIG. 4A, the elliptical cam 112 is arranged between the elongate member 402 and the plate member 410 aligning the perimeter of the second elliptical end 406 with the perimeter of the elliptical cam 112.

FIG. 4B, depicts the tapered cam slider 400 in an unassembled state with the flexible bearing 118 positioned between the elongate member 402 and the plate member 410. In use, the tapered cam slider 400 in configured to attain the assembled state with the elliptical cam 112 arranged between the elongate member 402 and the plate member 410, as shown in FIG. 4A. Further, the flexible bearing 118 is inserted into the elongate member 402 via the first circular end 404 and towards the second elliptical end 406. Thereafter, the flexible bearing 118 is further inserted along the elongate member 402 for being placed on the elliptical cam 112 using a hydraulic press. The use of the tapered cam slider 400 simplifies the fabrication or assembling process of the strain wave gearing device 100.

In accordance an embodiment, the strain wave gearing device 100 (gearbox) has undergone rigorous laboratory testing to assess its fatigue strength over a specified duration of 10,000 cycles, as well as to determine its maximum breaking torque capacity. The evaluation of fatigue strength involved affixing multiple plates of pre-determined weight to a terminus of a radial arm interconnected with an output of the strain wave gearing device 100. This configuration was established to emulate external loading conditions. Subsequently, the radial arm was set into motion, executing vertical non-uniform circular motion. The determination of the gearbox's breaking torque capability was achieved through a meticulous process. External torque was manually applied to the system using a calibrated torque wrench until the occurrence of catastrophic failure was observed. Throughout this procedure, the highest attainable torque value was constantly monitored by means of a static torque sensor. The results of these laboratory tests indicate that the current iteration of the gearbox is capable of sustaining a torque load of 10 Newton-meters (N-m) for a total of 10,000 cycles without experiencing failure. Furthermore, the gearbox demonstrates a breaking torque threshold of 45 N-m, representing the maximum torque value at which failure occurs under the specified testing conditions. These findings attest to the gearbox's robustness and reliability in operational scenarios.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural. The word "exemplary" is used herein to mean "serving as an example, instance or illustration". Any embodiment described as "exemplary" is not necessarily to be construed as preferred or advantageous over other embodiments or to exclude the incorporation of features from other embodiments. The word "optionally" is used herein to mean "is provided in some embodiments and not provided in other embodiments". It is appreciated that certain features of the present disclosure, which are, for clarity, described in the context of separate embodiments, may also be provided in combination in a single embodiment. Conversely, various features of the invention, which are, for brevity, described in the context of a single embodiment, may also be provided separately or in any suitable combination or as suitable in any other described embodiment of the disclosure

We claim:

1. A strain wave gearing device comprising:
   a circular spline having a plurality of internal teeth;
   a flex spline having a plurality of external teeth, the flex spline is disposed coaxially with respect to the circular spline to allow one or more of the plurality of external teeth to engage with one or more of the plurality of internal teeth, wherein the flex spline is defined by a Bezier curve, wherein the Bezier curve is constructed by a plurality of control points of the flex spline, and wherein coordinates of the plurality of control points are determined based on a plurality of structural parameters of the flex spline; and
   a wave generator having an elliptical cam and a flexible bearing mounted on the elliptical cam, the wave generator is disposed coaxially with respect to the flex spline to allow the flexible bearing to have two-point contact with the flex spline;
   a pair of output flanges operatively coupled to the flex spline;
   a ball bearing arranged between the pair of output flanges;
   a gearbox casing supporting the flex spline, the ball bearing and the pair of output flanges; and
   a cover coupled to the gearbox casing.

2. The strain wave gearing device of claim 1, wherein the plurality of structural parameters comprises:
   a width ($\alpha$) of contact of the flexible bearing with the flex spline;
   a length (L) of the flex spline;
   a curvature ($\gamma$) of the flex spline;
   an inner radius ($\beta$) of the flex spline;
   a thickness (t) of the flex spline; and
   a radius ($\delta$) of an output hub of the flex spline.

3. The strain wave gearing device of claim 1, wherein the plurality of external teeth are configured to be involute and are cut-into the flex spline.

4. The strain wave gearing device of claim 1, wherein the output hub of the flex spline has a first thickness and remaining portions of the flex spline have a second uniform thickness smaller than the first thickness.

5. The strain wave gearing device of claim 1, further comprising:
   a brushless motor operatively coupled to the elliptical cam of the wave generator; and
   a motor casing coupled to the brushless motor.

6. The strain wave gearing device of claim 1, wherein the flexible bearing is mounted on the elliptical cam using a tapered cam slider.

7. The strain wave gearing device of claim 6, wherein the tapered cam slider comprises:
   an elongate member having a first circular end and a tapered second elliptical end integral with the first circular end, wherein a perimeter of the second elliptical end is equal to a perimeter of the elliptical cam;
   a plate member having a diameter larger than the perimeter of the second elliptical end; and
   a plurality of fasteners for coupling the elongate member and the plate member, wherein the elliptical cam is configured to be arranged between the elongate member and the plate member aligning the perimeter of the second elliptical end with the perimeter of the elliptical cam.

8. The strain wave gearing device of claim 1, wherein the circular spline, flex spline and the wave generator are composed of plastic.

9. The strain wave gearing device of claim 1, wherein the circular spline, flex spline and the wave generator are made using 3D printing and vacuum casting.

* * * * *